United States Patent [19]

Grundmeier et al.

[11] 4,056,504

[45] Nov. 1, 1977

[54] POLYCARBONATE MOLDING COMPOSITIONS

[75] Inventors: Manfred Grundmeier; Rudolf Binsack; Hugo Vernaleken, all of Krefeld, Germany

[73] Assignee: Bayer Aktiengesellschaft, Leverkusen, Germany

[21] Appl. No.: 647,228

[22] Filed: Jan. 7, 1976

Related U.S. Application Data

[63] Continuation-in-part of Ser. No. 599,259, July 25, 1975, abandoned.

[30] Foreign Application Priority Data

Aug. 16, 1974 Germany .............................. 2439342
July 19, 1975 Germany .............................. 2532386

[51] Int. Cl.$^2$ ...................... C08L 67/02; C08L 69/00
[52] U.S. Cl. ................................ 260/37 PC; 260/860
[58] Field of Search ........................... 260/37 PC, 860

[56] References Cited

U.S. PATENT DOCUMENTS

| | | | |
|---|---|---|---|
| 3,218,372 | 11/1965 | Okamura et al. ..................... | 260/860 |
| 3,488,317 | 1/1970 | Hechelhammer et al. ...... | 260/37 PC |
| 3,639,331 | 2/1972 | Hattori et al. ................ | 260/37 PC X |
| 3,748,303 | 7/1973 | Becke et al. ................. | 260/37 PC X |
| 3,792,115 | 2/1974 | Kishikawa et al. .................. | 260/860 |
| 3,812,077 | 5/1974 | Hobbs ................................ | 260/40 R |

FOREIGN PATENT DOCUMENTS

| | | | |
|---|---|---|---|
| 1,234,122 | 6/1971 | United Kingdom ............ | 260/37 PC |

*Primary Examiner*—Sandra M. Person
*Attorney, Agent, or Firm*—Gene Harsh; Lawrence S. Pope; Frederick H. Colen

[57] ABSTRACT

The present invention is concerned with polycarbonate molding resins with improved flow and strength properties which contain about 10 to 40 wt.% glass fibers and about 0.5 to 5 wt. % of polyalkylene glycol terephthalate or about 0.5 to 10 wt.% of polyalkylene glycol isophthalate.

29 Claims, No Drawings

POLYCARBONATE MOLDING COMPOSITIONS

This application is a continuation-in-part of application Ser. No. 599,259, filed on July 25, 1975, and now abandoned.

It is known to prepare mixtures of polycarbonates of diphenols or dihydroxydiarylalkanes with polyalkylene terephthalic acid esters. Thus, German Auslegeschrift (German Published Specification) No. 1,187,793 describes mixtures of polycarbonates of dihydroxydiarylalkanes with 5 to 95% by weight of polyalkylene terephthalates which are distinguished by a greatly lowered melt viscosity. However, the hardness of these products is distinctly less than that of polycarbonates.

Further, German Offenlegungsschrift (German Published Specification) No. 1,694,124 describes mixtures of non-reinforced polycarbonates of dihydroxydiarylalkanes with 1–5% by weight of polyalkylene terephthalates, which are distinguished by substantially improved stress cracking resistance.

Further, it is known to process high molecular thermoplastic polycarbonates based on aromatic dihydroxy compounds, and having high filler contents, to give thermoplastic materials with a modified pattern of properties. Thus, the E-modulus and flexular strength of thermoplastic aromatic polycarbonates can be raised markedly by adding 10% by weight to 40% by weight of glass fibers, relative to the total composition. A disadvantage of these highly filled polycarbonates is their poor processability, because of the poorer flow of the melt.

Because of their high flexural strength, stiffness and E-moduli, reinforced polycarbonates are used preferentially in the manufacture of parts of housings, and of structural components. The poor flow of these products makes the manufacture of thin-walled articles impossible and thus precludes their broader use.

It has now been found, surprisingly, that the addition of as little as about 0.5 – 5% by weight of polyalkylene terephthalates, preferably of about 1 – 4% by weight, markedly improves the flow of the melts of these glass fiber reinforced polycarbonates without noticeably changing the other properties of these polycarbonates even the hardness of the polycarbonates is retained fully. In contrast, non-reinforced -polycarbonates of the same molecular weight show only little or no improvement in the melt flow on addition of 0.5–5% by weight of polyalkylene terephthalates.

Accordingly, the subject of the present invention are easy-flowing thermoplastic molding compositions of thermoplastic, high molecular, aromatic polycarbonates based on diphenols, about 10% by weight – 40% by weight of glass fibers, based on polycarbonate + glass fibers, and about 0.5% – 5% by weight, based on total mixture, of polyalkylene glycol terephthalates.

It has also been found that the addition of as little as about 0.5 – 10% by weight of polyalkylene-isophthalates, preferably about 1 – 7% by weight, markedly improves the flow properties of the melts of these glass fibre-reinforced polycarbonates without significantly changing the other properties of these polycarbonates; the hardness of the polycarbonates remains fully preserved. In addition, the polyester additive brings about better adhesion between the glass fibre and the polymer mixture.

In contrast, non-reinforced polycarbonates of the same molecular weight show only a slight improvement, if any, in the flow properties of the melt on addition of 0.5 – 10% by weight of polyalkylene-iso-phthalates.

Whilst the addition of larger amounts of polyalkylene-iso-phthalates leads to a further, linear improvement in the flow properties of the moulding materials, it at the same time detracts from the polycarbonate properties such as, for example, resistance to heat distortion, impact strength and the like.

Accordingly, the subject of the present invention are also easy-flowing thermoplastic moulding materials of thermoplastic, high-molecular, aromatic polycarbonates based on diphenols, about 10% by weight – 40% by weight, based on the total mixture, of glass fibres, and about 0.5–10% by weight, based on the total mixture, of polyalkylene glycol isophthalates.

Suitable high molecular thermoplastic aromatic polycarbonates for the mixtures in the sense of the present invention are polycarbonates which are prepared from diphenols and phosgene, or the bis-chlorocarbonic acid esters of the diphenols, in accordance with the known process of phase boundary polycondensation. Further suitable high molecular thermoplastic aromatic polycarbonates are those obtainable in accordance with the known transesterification process by reaction of bisphenol A with diphenyl carbonate. The molecular weights ($\overline{M}_w$) of the polycarbonates to be used according to the invention are between about 10,000 and 100,000, preferably between about 20,000 and 40,000.

Examples of suitable diphenols are hydroquinone, resorcinol, 4,4'-dihydroxydiphenyl, bis-(hydroxyphenyl)-alkanes, such as, for example, $C_1C_8$-alkylene or $C_2$-$C_8$-alkylidene-bisphenols, bis-(hydroxyphenyl)-cycloalkanes such as, for example, $C_5$-$C_{15}$-cycloalkylene- or $C_5$-$C_{15}$-cycloalkylidene bisphenols, and bis-(hydroxyphenyl)-sulphides, -ethers, -ketones, -sulphoxides or -sulphones, as well as $\alpha,\alpha'$-bis-(hydroxyphenyl)-diisopropylbenzene and the corresponding nuclear-alkylated or nuclear-halogenated compounds. Polycarbonates based on bis-(4-hydroxyphenyl)-propane-2,2 (bisphenol A), bis- (4-hydroxy-3,5-dichlorophenyl)-propane-2,2 (tetrachlorobisphenol A), bis (4-hydroxy-3,5-dibromophenyl)-prpane-2,2 (tetrabromobisphenol A), bis-(4-hydroxy-3,5-dimethylphenyl)-propane-2,2 (tetramethylbisphenol A), bis-(4-hydroxy-3-methyl-phenyl)-propane-2,2 and bis-(4-hydroxyphenyl)-cyclohexane-1,1 (bisphenol Z), or based on trinuclear bisphenols, such as $\alpha,\alpha'$-bis-(4-hydroxyphenyl)-p-diisopropylbenzene, are preferred.

Further bisphenols suitable for the preparation of polycarbonates are described in U.S. Pat. Nos. 3,028,365; 2,999,835; 3,148,172; 3,271,368; 2,970,131; 2,991,273; 3,271,367; 3,280,078; 3,014,891; 2,999,846; and German Published Specifications Nos. 2,063,050 (Le A 13 359), 2,063,052 (Le A 13 425), 2,211,957 (Le A 14 240) and 2,211,956 (Le A 14 249). Le A 15 841

Suitable glass fibres in the sense of the present invention are all commercially available grades and types of glass fibres, that is to say chopped glass filaments (long glass fibres and short glass fibres), rovings or staple fibres, if they have been provided with a polycarbonate-compatible finish by means of suitable sizes.

The length of the glass filaments, whether these are bundled to form fibres or not, should be between 60 mm and 6 mm in the case of long glass filaments whilst with short glass filaments the maximum length should be between 5 mm (5,000 $\mu$m) and 0.05 mm (50 $\mu$m).

Two types of glass fibres are particularly preferred:

1. Long glass fibres with an average fibre length of 6,000 μm, a diameter of 10 μm and a powder content (<50 μm) of about 1% by weight and
2. ground short glass fibres with an average fibre length of 230 μ, a diameter of 10 μ and a powder content (<50 μ) of 5% by weight.

The glass material which can be used is alkali-free aluminium-boron-silicate glass ("E-glass") or the alkali-containing "C-glass".

Suitable sizes which can be used are those known from the literature; the water-based size known for short glass fibres (compare DT-AS (German Published Specification) No. 1,201,991) has proved particularly suitable for polycarbonate compositions.

Further details regarding glass fibres and their use in plastics, especially in polycarbonates, are known from "Harro Hagen, Glasfaserverstärkte Kunststoffe" (Glass fibre-reinforced plastics), Springer-Verlag, Berlin, Gottingen, Heidelberg, 1961 (especially pages 182 – 252) and from U.S. Pat. No. 3,577,378 (Ue 2159-Cip).

The reinforced polycarbonates can optionally additionally contain pigments such as, for example, $TiO_2$ and other similar fillers, stabilizers and other additives, without destroying the pattern of properties.

Polyalkylene glycol terephthalates in the sense of the present invention are, for example, those based on ethylene glycol, 1,3-propanediol, 1,4-butanediol, 1,6-hexanediol and 1,4-bis-hydroxymethylcyclohexane. The molecular weights ($\overline{M}_w$) of these polyalkylene glycol terephthalates are between about 10,000 and 80,000. The polyalkylene glycol terephthalates can be obtained in accordance with known processes, for example, by transesterification from terephthalic acid dialkyl esters and the appropriate diol (see, for example, U.S. Pat. Nos. 2,647,885; 2,643,989; 2,534,028; 2,578,660; 2,742,494 and 2,901,466).

For example, a lower alkyl ester of terephthalic acid, preferably the dimethyl ester, is used as the starting material and is transesterified with an excess of diol, in the presence of suitable catalysts, to form the bis-hydroxyalkyl ester of terephthalic acid. In the course of this reaction, the temperature is raised from a starting value of 140° C to 210°–220° C. The alcohol liberated is distilled off. The condensation to increase the molecular weight is subsequently carried out at temperatures of 210°–280° C during which the pressure is lowered in stages to less than 1 mm Hg and the excess diol is distilled off.

Polyalkylene glycol isophthalates in the sense of the present invention are polyesters, which are in themselves known, based on aliphatic, cycloaliphatic and araliphatic diols, such as, for example, ethylene glycol, 1,3-propanediol, 2,2-dimethyl-1,3-propanediol; 1,4-butanediol, 1,6-hexanediol, 1,4-bis-hydroxy-methylcyclohexane and bisphenol-A bis-glycol ether as well as mixtures of these diols.

In the polyalkylene-isophthalates in the sense of the present invention, which are in themselves known, up to 75 mol % of the isophthalic acid can be replaced by aliphatic, cycloaliphatic and aromatic dicarboxylic acids. Examples of aliphatic dicarboxylic acids include succinic acid, glutaric acid, adipic acid, pimelic acid, suberic acid, azelaic acid and sebacic acid; an example of a cycloaliphatic dicarboxylic acid is 1,4-cyclohexanedicarboxylic acid. Examples of aromatic dicarboxylic acids which may be mentioned are ophthalic acid, terephthalic acid, 1,5- and 1,6-naphthalenedicarboxylic acid, 4,4'-, 4,3'- and 3,3'-diphenyldicarboxylic acid and 4,4'-, 4,3'- and 3,3'-diphenylsulphonedicarboxylic acid. These dicarboxylic acids can optionally carry alkyl or halogen substituents.

The molecular weights ($M_w$) of the polyalkylene glycol isophthalates in the sense of the present invention are between 10,000 and 80,000. They can be obtained in accordance with processes which are in themselves known, for example from the dicarboxylic acids or their dialkyl esters and the corresponding diols (see, for example, U.S. Pat. Nos. 2,647,885, 2,643,989, 2,534,028, 2,578,660, 2,742,494 and 2,901,466).

For example, a lower alkyl ester of isophthalic acid, preferably the dimethyl ester, is used as the starting material and this is trans-esterified with an excess of diol in the presence of suitable catalysts to give the bis-hydroxyalkyl ester of isophthalic acid. In this process the temperature is raised, starting from 140° C, to 210°–220° C. The alcohol liberated is distilled off. The condensation is carried out subsequently at temperatures of 210°–280° C and in the course thereof the pressure is lowered stepwise to less than 1 mm Hg, whilst distilling off the excess diol.

The molding compositions according to the invention, based on aromatic polycarbonates, are prepared according to processes which are in themselves known.

Thus, the polycarbonates together with the fillers, the polyalkylene glycol terephthalates or the polyalkylene glycol isophthalates and optionally, pigments, stabilizers and other additives can be processed in single-screw or twin-screw extruders to give a homogeneous thermoplastic mass. It is however, also possible for polycarbonate which has already been reinforced to be subsequently homogenized with the polyalkylene glycol terephthalate or the polyalkylene glycol isophthalate in the same way. A further method of incorporation is to mix the components thoroughly in an internal kneader, followed by ribbon granulation.

The mixing time and mixing temperature should be so chosen that there is no substantial formation of copolyestercarbonates by intermolecular transesterification, that is to say that essentially only a physical mixture is produced, in which the polymers are present in a uniformly distributed form. Accordingly, the mixtures are generally prepared at temperatures between about 250° and 300° C. preferably between about 270° and 290° C. At these temperatures, the mixing times should not be more than about 5 minutes.

The polycarbonate molding compositions according to the invention are used whenever a high E-modulus, flexural strength and stiffness coupled with good toughness properties is demanded, as for example, for dimensionally stable moldings of all kinds, such as parts of housings, and structural components.

The Examples which follow are intended to explain the subject of the invention in more detail.

EXAMPLE 1

Preparation of a Polycarbonate

Approximately 454 parts of 4,4'-dihydroxydiphenyl-2,2-propane and 9.5 parts of p-tert.butylphenol are suspended in 1.5 L of water. The oxygen is removed from the reaction mixture in a 3-neck flask equipped with a stirrer and gas inlet tube, by passing nitrogen through the reaction mixture for 15 minutes while stirring. 355 parts of 45% strength sodium hydroxide solution and 1,000 parts of methylene chloride are then added. The mixture is cooled to 25° C. 237 parts of phosgene are added over a period of 120 minutes while maintaining the temperature of 25°0 C by cooling. An additional amount of 75 parts of 45% strength sodium hydroxide solution is added after 15-30 minutes or after the absorption of phosgene has started. 1.6 parts of triethylamine are added to the resulting solution and the mixture is stirred for a further 15 minutes. A highly viscous solution is obtained, the viscosity of which is regulated by addition of methylene chloride. The aqueous phase is separated off. The organic phase is washed with water until free from salt and alkali. The polycarbonate is isolated from the washed solution, and dried. It has a relative viscosity of 1.29-1.30 measured in an 0.5% strength methylene chloride solution at 20° C. This corresponds approximately to a molecular weight ($\overline{M}_w$) of 31,000. The polycarbonate thus obtained is extruded and granulated.

EXAMPLE 2

Preparation of a polyalkylene glycol terephthalate, namely of polyethylene glycol terephthalate:

97 parts of terephthalic acid dimethyl ester, 71 parts of ethylene glycol, 0.15 part of anyhydrous calcium acetate and 0.4 part of antimony trioxide are introduced into a round flask equipped with a distillation attachment, air condenser and gas inlet capillary. The air is removed from the apparatus by evacuating the apparatus and filling it with nitrogen. The components are fused by heating to 170° C. A gentle stream of nitrogen is passed through the capillary. The methanol produced during the transesterification, which starts immediately, is distilled off. After approximately 1 hour, the splitting off of methanol slackens and the temperature is raised to 200° C for 2 hours, during which the remainder of the methanol is removed. Excess ethylene glycol is then distilled off at 220° C and the temperature is raised to 280° C. At this temperature, the apparatus is gradually evacuated down to approximately 0.3 mm Hg. After a further 3 hours, the reaction is complete. The resulting polyethylene terephthalate has a relative viscosity of 2.10 measured in a 1% strength solution in a solvent mixture of equal parts of phenol and tetrachloroethane at 25° C. This corresponds approximately to a molecular weight of 28,000.

EXAMPLES 3-11:

Polycarbonates employed

A. Polycarbonate from Example 1

B. Reinforced polycarbonate consisting of 70% by weight of polycarbonate from Example 1 and 30% by weight of short glass fibers having a maximum length of about 1 mm.

C. Reinforced polycarbonate consisting of 80% by weight of polycarbonate based on bisphenol A, prepared according to Example 1, $\overline{M}w$ = 33,000, and 20% by weight of long glass fibers of approximate length 6 mm.

Polyalkylene glycol terephthalates employed

D. Polyethylene glycol terephthalate from Example 2.

E. Polybutylene glycol terephthalate, $\overline{M}w$ = approximately 36,000 prepared according to Example 2.

The table which follows shows mixtures and their melt indices (according to DIN 53 735 at 300° C, piston pressure 1.2 kp). The mixtures are obtained by mixing the components in twin-screw extruders.

Table

| Example | | 3 | 4 | 5 | 6 | 7 | 8 | 9 | 10 | 11 |
|---|---|---|---|---|---|---|---|---|---|---|
| Polycarbonate | A | 100 | 95 | 95 | — | — | — | — | — | — |
| Polycarbonate | B | — | — | — | 100 | 99 | 96 | 95 | — | — |
| Polycarbonate | C | — | — | — | — | — | — | — | 100 | 98 |
| Polyethylene glycol terephthalate | D | — | 5 | — | — | 1 | 4 | — | — | — |
| Polybutylene glycol terephthalate | E | — | — | 5 | — | — | — | 5 | , | 2 |
| Rockwell hardness M | | — | — | — | 83 | 84 | 83 | 82 | 88 | 88 |
| E-modulus [MPa] | | — | — | — | 5,830 | 5,850 | 5,800 | 5,810 | 5,770 | 5,750 |
| Melt index at 300° C according to DIN 53 735 [g/10 mins.] | | 3.61 | 3.90 | 3.86 | 1.46 | 2.57 | 3.82 | 3.98 | 1.61 | 3.24 |

EXAMPLE 12

Preparation of Polyethylene Glycol Isophthalate 97 parts of isophthalic acid dimethyl ester, 71 parts of ehtylene glycol, 0.15 part of anhydrous calcium acetate and 0.4 part of antimony trioxide are introduced into a round flask equipped with a distillation attachment, air condenser and gas inlet capillary. The air is removed from the apparatus by evacuation and filling with nitrogen. The components are melted by heating to 170° C. A gentle stream of nitrogen is passed through the capillary. The methanol produced during the trans-esterification, which starts immediately, is distilled off. After about 1 hour the elimination of methanol slackens and the temperature is raised to 200° C for 2 hours, in the course of which the remaining methanol is removed. Thereafter excess ethylene glycol is distilled off at 220° C and the temperature is raised to 270° C. At this temperature, the apparatus is gradually evacuated down to about 0.3 mm Hg, in the course of which the polycondensation to give polyethylene glycol isophthalate takes place, with elimination of ethylene glycol. After a further 3 hours the reaction is complete. The polyethylene isophthalate obtained has a relative viscosity of 2.01, measured in a 1% strength solution in a solvent mixture of equal parts of phenol and tetrachloroethane at 25° C, this corresponds approximately to a molecular weight ($\overline{M}w$) of 25,000.

EXAMPLE 13

Preparation of a polybutanediol iso/terephthalate from 1,4-butanediol and 40% of isophthalic acid dimethyl ester and 60% of terephthalic acid dimethyl ester.

40 parts of isophthalic acid dimethyl ester, 60 parts of terephthalic acid dimethyl ester, 65 parts of butanediol and 0.02 part of tetraisopropyl-o-titanate are introduced into a round flask equipped with a distillation attachment, air condenser and gas inlet capillary. The air is removed from the apparatus by evacuation and filling with nitrogen. The components are melted by heating to 160° C. A slight stream of nitrogen is passed through the capillary. The methanol produced during the transesterification, which starts immediately, is distilled off. After about 1 hour the elimination of methanol slackens The table which follows contains mixtures and their melt indices (according to DIN 53,735, at 300° C, piston pressure 1.2 kp). The mixtures are obtained by mixing the components in twin-screwextruders.

Table

| Example | 15 | 16 | 17 | 18 | 19 | 20 | 21 | 22 | 23 | 24 |
|---|---|---|---|---|---|---|---|---|---|---|
| Polycarbonate A | 100 | 95 | 93 | — | — | — | — | — | — | — |
| Polycarbonate B | — | — | — | 100 | 98 | 94 | 96 | — | — | — |
| Polycarbonate C | — | — | — | — | — | — | — | 100 | 93 | 97 |
| Polyethylene glycol isophthalate D | — | 5 | — | — | 2 | — | — | — | — | — |
| Polybutanediol iso/terephthalate E | — | — | 7 | — | — | 6 | — | — | 7 | — |
| Polyethylene glycol isophthalate/sebacate F | — | — | — | — | — | — | 4 | — | — | — |
| Poly-1,4-bis-hydroxymethyl-cyclohexane-isophthalate G | — | — | — | — | — | — | — | — | — | 3 |
| Rockwell hardness M | — | — | — | 83 | 82 | 83 | 86 | 87 | 88 | 88 |
| E-Modulus [MPa] | — | — | — | 5830 | 5810 | 5840 | 5790 | 5770 | 5750 | 5790 |
| Melt index at 300° C according to DIN 53,735 [g/10 min] | 3.62 | 4.04 | 3.98 | 1.47 | 3.47 | 5.29 | 4.69 | 1.59 | 5.47 | 4.12 | and the temperature is raised for 2 hours to 180° C and subsequently for a further hour to 200° C, in the course of which the remaining methanol is removed. Thereafter the excess butanediol is distilled off whilst raising the temperature to 260° C and lowering the pressure to 0.3 mm Hg. The temperature is maintained for 45 – 60 minutes, in the course of which the polycondensation to give polybutanediol iso/terephthalate takes place with elimination of butanediol.

The resulting polybutanediol iso/terephthalate has a relative viscosity of 2.10, measured in a 1% strength solution in a solvent mixture of equal parts of phenol and tetrachloroethane at 25° C. This corresponds approximately to a molecular weight ($\overline{M}w$) of 28,000.

EXAMPLE 14

Preparation of a polyethylene glycol isophthalate/sebacate from 90 mol % of isophthalic acid dimethyl ester, 10 mol % of sebacic acid dimethyl ester and ethylene glycol. 87 parts of isophthalic acid dimethyl ester, 9.2 parts of sebacic acid dimethyl ester, 71 parts of ethylene glycol, 0.15 part of anyhydrous calcium acetate and 0.4 part of antimony trioxide are reacted as in Example 2, with the difference that the temperature during the condensation is not 280° C but only 260° C. The resulting polyethylene isophthalate/sebacate has a relative viscosity of 2.30, measured in a 1% strength solution in a solvent mixture of equal parts of phenol and tetrachloroethane at 25° c. This corresponds aproximately to a molecular weight ($\overline{M}w$) of 32,000.

EXAMPLES 15–24

Polycarbonates employed

A. Polycarbonate from Example 1.

B. Reinforced polycarbonate consisting of 70% by weight of polycarbonate from Example 1 and 30% by weight of short glass fibres of maximum length about 1 mm.

C. Reinforced polycarbonate consisting of 80% by weight of a polycarbonate based on bisphenol A, prepared according to Example 1, $\overline{M}w = 33,000$, and 20% by weight of long glass fibres of about 6 mm length.

D. Polyethylene glycol isophthalate from Example 12.

E. Polybutanediol iso/terephthalate from Example 13.

F. Polyethylene glycol isophthalate/sebacate from Example 14.

G. Poly-1,4-bis-hydroxymethyl-cyclohexane-isophthalate, $\overline{M}w = 39,000$, prepared analogously to Example 12.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. Thermoplastic molding compositions comprising
   a. high molecular aromatic polycarbonates based on diphenols,
   b. about 10% by weight to 40% by weight based on the polycarbonate + glass fibers, of glass fibers, and
   c. about 4% by weight to 0.5% by weight, based on the total mixture, of a polyalkylene glycol terephthalate, or a. high molecular aromatic polycarbonates based on diphenols
   b. about 10% by weight to 40% by weight, based on the total mixture, of glass fibers and
   c. about 10% by weight to 0.5% by weight, based on the total mixture of a polyalkylene glycol isophthalate.

2. Thermoplastic molding compositions comprising
   a. high-molecular aromatic polycarbonates based on diphenols
   b. about 10% by weight to 40% by weight, based on the polycarbonate + glass fibers, of glass fibers
   c. about 4% by weight to 1% by weight, based on the total mixture, of a polyalkylene glycol terephthalate.

3. Thermoplastic molding compositions according to claim 2, characterized in that polyethylene terephthalate is used as the polyalkylene glycol terephthalate.

4. The molding composition of claim 2 characterized in that polybutylene terephthalate is used as polyalkylene glycol terephthalate.

5. Thermoplastic molding compositions comprising
   a. high-molecular aromatic polycarbonates based on diphenols
   b. about 10% by weight to 40% by weight, based on the total mixture, of glass fibers and
   c. about 10% by weight to 0.5% by weight, based on the total mixture, of a polyalkylene glycol isophthalate.

6. Thermoplastic molding compositions of claim 5, characterized in that a polyalkylene glycol isophthalate is used in which up to 75 mol-% of the isophthalic acid has been substituted by other dicarboxylic acids.

7. Thermoplastic molding compositions of claim 5, charaterized in that polyethylene glycol isophthalate is used as polyalkylene glycol isophthalate.

8. Thermoplastic molding compositions of claim 5, characterized in that poly-1,4-bis hydroxymethyl-cyclohexane isophthalate is used as polyalkylene glycol isophthalate.

9. A process for improving the melt viscosity of high molecular weight aromatic polycarbonate molding resins containing about 10 to 40 wt.% glass fibers, based on the weight of the polycarbonate and glass fibers, comprising incorporating about 0.5 to 4 wt.%, based on the weight of the total mixture, of a polyalkylene glycol terephthalate into the molding resin.

10. The process of claim 9 wherein the polyalkylene glycol terephthalate is polyethylene terephthalate.

11. The process of claim 9 wherein the polyalkylene glycol terephthalate is polybutylene terephthalate.

12. The process of claim 9 wherein the polyalkylene glycol terephthalate is incorporated at temperatures between about 250° and 300° C with a mixing time of not more than about 5 minutes.

13. The process of claim 12 wherein the temperature of incorporation is between about 270° and 290° C.

14. The process of claim 9 wherein the incorporation conditions are such that substantially no transesterification takes place between the polycarbonate and the polyalkylene glycol terephthalate.

15. The process of claim 9 wherein the components are processed in an extruder.

16. The process of claim 15 wherein the polyalkylene glycol terephthalate is incorporated into a polycarbonate which already contains glass fibers.

17. The process of claim 9 wherein the components are mixed in an internal kneader and then ribbon granulated.

18. A process for improving the melt viscosity of high molecular weight aromatic polycarbonate molding resins containing about 10 to 40 wt.% glass fibers, based on the weight of the polycarbonate and glass fibers, comprising incorporating about 0.5 to 10 wt.%, based on the weight of the total mixture, of a polyalkylene glycol isophthalate into the molding resin.

19. The process of claim 18 wherein a polyalkylene glycol isophthalate is used in which up to 75 mol% of the isophthalic acid has been substituted by other dicarboxylic acids.

20. The process of claim 18 wherein the polyalkylene glycol isophthalate is polyethylene glycol isophthalate.

21. The process of claim 18 wherein the polyalkylene glycol isophthalate is poly-1,4-bis-hydroxymethyl-cyclohexane isophthalate.

22. The process of claim 18 wherein the polyalkylene glycol isophthalate is incorporated at temperatures between about 250° and 300° C with a mixing time of not more than about 5 minutes.

23. The process of claim 22 wherein the temperature of incorporation is between about 270° and 290° C.

24. The process of claim 18 wherein the incorporation conditions are such that substantially no transesterification takes place between the polycarbonate and the polyalkylene glycol isophthalate.

25. The process of claim 18 wherein the components are processed in an extruder.

26. The process of claim 25 wherein the polyalkylene glycol isophthalate is incorporated into a polycarbonate which already contains glass fibers.

27. The process of claim 18 wherein the components are mixed in an internal kneader and then ribbon granulated.

28. The thermoplastic molding compositions of claim 5 wherein the polyalkylene glycol isophthalate is present in from about 7% by weight to 1% by weight, based on the total mixture.

29. The process of claim 18 wherein about 1 to 7 wt.%, based on the weight of the total mixture, of a polyalkylene glycol isophthalate is incorporated into the molding resin.

* * * * *